July 9, 1963

J. K. CLARK 3,097,289

PROBE SOCKET ASSEMBLY

Filed Oct. 30, 1959

INVENTOR.
JESSE K. CLARK

BY

Lindsey and Prutzman
ATTORNEYS

July 9, 1963

J. K. CLARK 3,097,289

PROBE SOCKET ASSEMBLY

Filed Oct. 30, 1959

INVENTOR.
JESSE K. CLARK

BY

*Lindsey and Prutzman*
ATTORNEYS

United States Patent Office 3,097,289
Patented July 9, 1963

3,097,289
PROBE SOCKET ASSEMBLY
Jesse K. Clark, Newington, Conn., assignor, by mesne assignments, to National Distillers and Chemical Corporation, Bridgeport, Conn., a corporation of Virginia
Filed Oct. 30, 1959, Ser. No. 849,907
6 Claims. (Cl. 219—44)

This invention generally relates to electric cooking appliances and the like having a detachable thermostat, and is more particularly concerned with an improved socket assembly for receiving the temperature-sensing probe of the thermostat.

It is the aim of the present invention to provide a socket assembly for thermostat probes which is economical to manufacture, is rugged and reliable in use and has increased thermal efficiency for sensing and transmitting the temperature of the container to the probe with a minimum of heat loss. A further aim is to provide such a socket assembly which is easily attached to a laminated container in an improved manner and which insures highly efficient heat conduction from the heat-conductive core of the container to the temperature probe of the thermostat.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
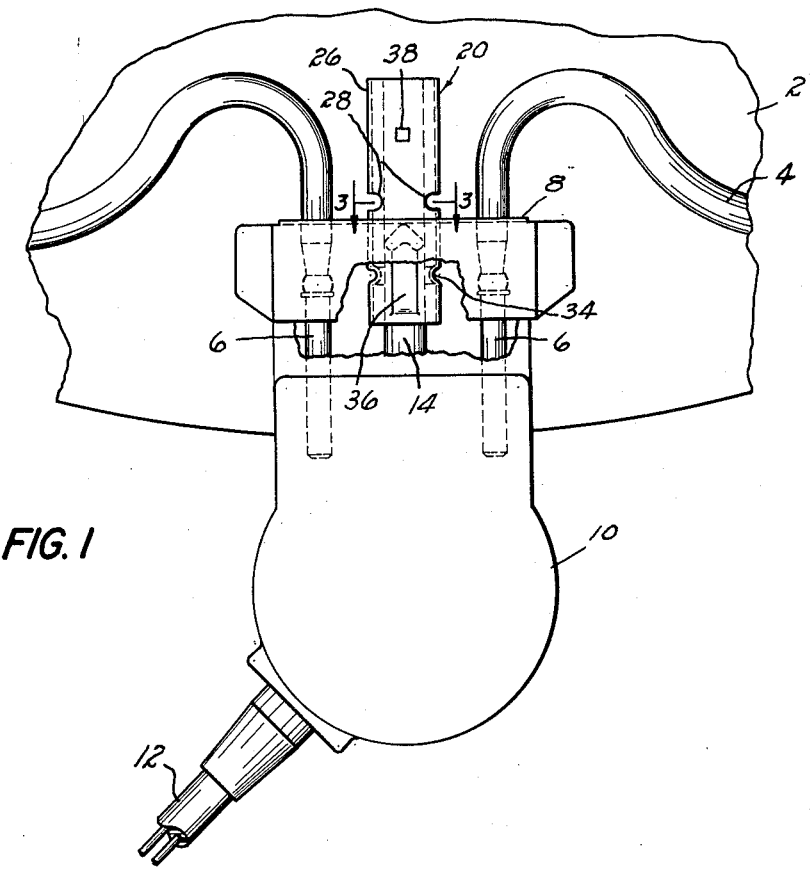
FIGURE 1 is a fragmentary bottom view of an electric fry pan utilizing the probe socket assembly of the present invention and having portions of the terminal housing and thermostat broken away.

Referring to the attached drawings, there is illustrated an electric cooking appliance, particularly a fry pan, generally comprised of a container 2, a tubular heating element 4 secured to the bottom of the container and having terminal studs 6, a terminal housing 8 and a detachable thermostat 10 which butts against terminal housing 8 and receives terminals 6 in the sockets 7 to establish electrical connection to the heating element from power cord 12. Thermostat 10 also carries probe 14 to sense the temperature of container 2 to actuate a conventional thermostatic switch 16 whose temperature setting is conrolled by knob 18.

Figure 3:
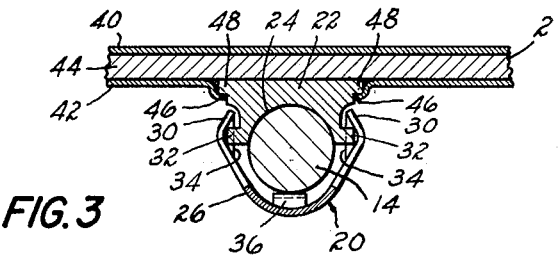
FIGURE 3 is an enlarged section along the line 3—3 of FIGURE 1.
Figure 4:
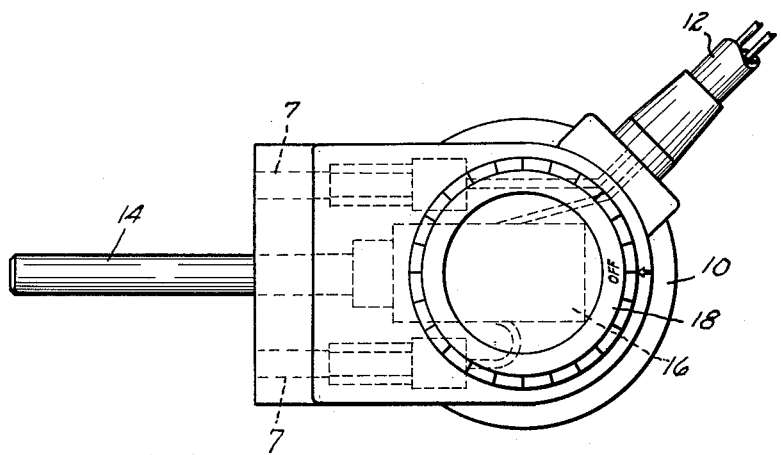
FIGURE 4 is a top plan view of the thermostat control unit.

Secured to the bottom of the container 2 for receiving temperature-sensing probe 14 is the socket assembly of the present invention, generally designated by the numeral 20. As best illustrated in FIG. 3, an elongate, highly heat-conductive metal probe key 22 is secured in intimate contact with the bottom of the container 2 and has a longitudinal groove 24 for seating the temperature 14 in the surface opposite to that secured to the container. The groove 24 conforms substantially to the configuration of the probe 14 to insure maximum surface contact and efficient heat transfer from the probe key to the probe. In the preferred embodiment illustrated in the attached drawings, an arcuate groove is struck by a radius substantially equal to that of the probe and is approximately semi-circular in cross section.

An elongate, substantially U-shaped cap 26, preferably fabricated from resilient sheet metal or relatively low heat conductivity, is resiliently engaged on the probe key 22 and is spaced from the probe 14 to provide an insulating air layer thereabout. The leg portions of the cap 26 are provided with notches 28 to increase their flexibility, and the inwardly bent edge portions 30 thereof are snapped into engagement with key 22 behind lateral shoulders 32. Longitudinal movement of the cap 26 relative to the key 22 is prevented by the indents 34 in the leg portions of the cap which engage in complementarily shaped notches formed in the shoulders 32 of the key.

A spring finger 36 formed by a U-shaped incision in the crown of the cap and an indent 38 spaced longitudinally therefrom press the probe 14 firmly into intimate contact with the groove for optimum heat transfer therebetween. As best illustrated in FIGURE 2, the end of the spring finger 36 is reversely bent to minimize contact with the probe 14 and heat loss thereby.

Figure 2:
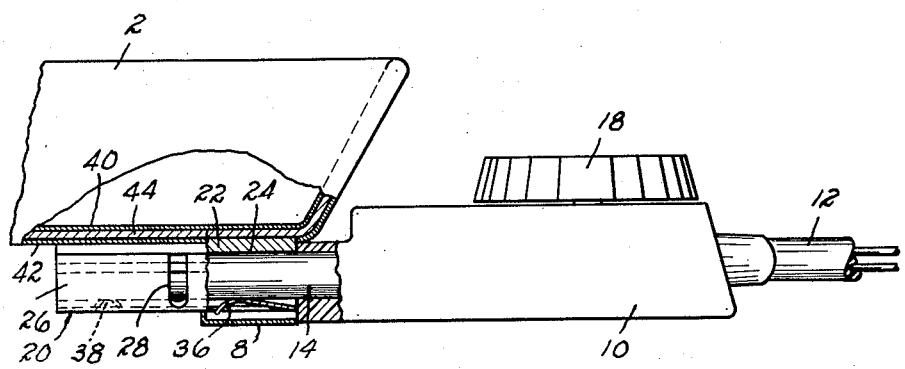
FIGURE 2 is a fragmentary side view of the fry pan of FIGURE 1 with portions of the various elements broken away to reveal internal construction.

Referring next to a preferred mounting of the probe key 22 on container 2, which is best shown in FIGS. 2 and 3, the metallic container 2 is fabricated from inner laminate 40 and outer laminate 42 of stain-resistant alloy, such as stainless steel, and core 44 of highly heat-conductive metal, such as copper or aluminum. On the bottom of the container, outer laminate 42 is provided with an elongate rectangular opening and lateral cuts at the ends of the opening which extend into the metal on either side thereof, enabling the bending of the edge portions of the laminate outwardly of the core 44 and then laterally oppositely to provide integral lips 46. The probe key 22 is dimensioned to substantially fill the elongate opening and has longitudinal flanges 48 along its sides adjacent the core 44 which interlock with the lips 46 of the outer laminate 42. The probe key 22, which is most desirably formed from the same metal as the core, is preferably bonded thereto and to the lip portions of the outer laminate, conveniently by brazing, so as to provide most intimate contact and a highly efficient heat-conducting path from the core of the container to the probe key.

For operative assembly, the probe 14 is inserted in the groove 24 of the probe key 22 and is pushed inwardly between the probe key 22 and spring finger 36 until the terminal studs 6 seat in the terminal-receiving sockets 7. The probe 14 is held in firm peripheral contact with the groove 24 of the key by the spring finger 36 and indent 38.

Overlapping lips 46 of the outer laminate and the U-shaped cap 26, being made of metal of relatively low-heat conductivity, substantially shield the probe key 22 from cooling air currents and minimize radiation of heat therefrom. The placement of the spring finger portion of the cap within the terminal housing provides an insulating air portion therewithin for further minimization of heat radiation losses.

It can be readily seen that the probe-receiving socket assembly of the present invention permits accurate determination of the temperature of the container by reason of the efficient and rapid rate of heat transfer to the probe for actuation of the switch in the thermostat. Since the probe socket is directly in contact with the heat-conductive core of the container and since the probe is being urged into intimate surface contact with the probe key by the spring finger of the cap, a highly efficient heat-conducting path is provided. The cap construction also insures an insulating layer of air around the exposed portions of the probe and shields the major surface area of the probe socket, thus minimizing heat loss from the socket and probe and additionally providing a more pleasing general appearance by the use of a stain-resistant metal.

As will be apparent to persons skilled in the art, various modifications and adaptations of the structure above described will become readily apparent without departure

I claim:

1. A container for use in an electrical appliance of the type having a detachable thermostat with heat-sensing probe, said container having a core of highly heat-conductive metal and an outer laminate with an opening therein, a probe key seated in said opening and intimately secured to the heat-conductive metallic core, said probe key having longitudinal flanges along its sides adjacent said core, lips formed on said outer laminate adjacent the opening and bent over into interlocking engagement with said flanges, said probe key having a groove in the outer surface thereof for receiving the probe of the thermostat, a cap engaged on said key enclosing the probe-receiving groove portion thereof to provide an insulating air layer about the groove, and means on said cap for urging the probe of the thermostat into contact with the groove of the probe socket.

2. A laminated metallic container for use in an electrical appliance of the type having a detachable thermostat with heat-sensing probe, said container having a core of highly heat-conductive metal and an outer laminate of stain-resistant metal, said outer laminate having an opening therein with portions adjacent said opening bent outwardly and toward each other to define laterally extending lips, an elongated probe key seated in said opening in intimate contact with said core and having longitudinal flanges along its sides adjacent said core interlocked with the lips of the outer laminate, said probe key having a longitudinal groove in the surface thereof opposite that in contact with the core for receiving an associated probe, a cap supported on said key and enclosing the probe-receiving groove portion thereof to provide an insulating air layer about the groove, and resilient means on said cap for urging the probe of the thermostat into intimate contact with the groove of the probe key.

3. A laminated metallic container for use in an electrical appliance of the type having a detachable thermostat with cylindrical temperature probe, said container having a core of highly heat-conductive metal and a stain-resistant metallic outer laminate having an elongated opening therein with portions adjacent said opening bent outwardly and laterally opposite toward each other to define laterally extending lips, an elongated probe key of highly heat-conductive metal substantially filling and secured in said opening in intimate contact with said core, the sides of said key having longitudinal flanges adjacent said core interlocked with the lateral lips of the outer laminate and having lateral shoulders spaced from said flanges, said key further having a longitudinal arcuate groove in the surface opposite to that in contact with said core for receiving an associated probe, and a substantially U-shaped cap resiliently engaged on said key and enclosing the probe-receiving groove portion thereof to provide an insulating air layer about the groove, the legs of said cap having inwardly bent edge portions engaged behind the shoulders of said probe key, and an inwardly disposed spring finger on the crown of said cap for urging an associated probe into intimate contact with the probe-receiving groove of the key.

4. A laminated metallic container for use in an electrical appliance of the type having a detachable thermostat with cylindrical temperature probe, said container having a core of highly heat-conductive metal and a stain-resistant metallic outer laminate having an elongated opening therein, an elongated probe key of highly heat-conductive metal substantially filling said opening and bonded to said core therein, said key having lateral shoulders along its sides spaced from said core and having a longitudinal arcuate groove in the surface opposite to that in contact with said core for receiving an associated temperature probe, and a substantially U-shaped cap resiliently engaged on said key and enclosing the probe-receiving groove portion thereof to provide an insulating air layer about the groove, the legs of said cap having inwardly bent edge portions engaged behind the shoulders of said probe key, and an inwardly disposed spring finger on the crown of said cap for urging an associated probe into intimate contact with the probe-receiving groove of the key.

5. In an electrical appliance of the type having a container, a heating element secured to the container and a detachable thermostat with a heat-sensing probe for determining the temperature of the container, a probe-receiving socket assembly secured to said container comprising an elongated probe key of highly heat-conductive metal secured in intimate contact with said container and having a longitudinal arcuate probe-receiving groove in the surface opposite that secured to the container, said key having lateral shoulders along its sides spaced outwardly from the container, a substantially U-shaped key cap resiliently engaged on said probe key and enclosing the probe-receiving groove portion thereof to provide an insulating air layer about the groove, the legs of said U-shaped cap having inwardly bent edge portions engaged behind the lateral shoulders of said probe key, and a resilient inwardly disposed spring finger integral with said cap for urging an associated probe into intimate contact with the probe-receiving groove of the key.

6. A container for use in an electrical appliance of the type having a detachable thermostat with heat-sensing probe, said container having a core of highly heat-conductive metal and an outer metallic laminate with an opening therein, a probe key seated in said opening and intimately secured to the heat-conductive metallic core, said probe key having longitudinal flanges along its sides adjacent said core, lips formed on said outer laminate adjacent the opening and bent over into interlocking engagement with said flanges, said probe key having a groove in the outer surface thereof for receiving the probe of the thermostat, and a cap assembly supported on said probe key and covering said groove.

References Cited in the file of this patent

UNITED STATES PATENTS

| | | |
|---|---|---|
| 2,834,868 | Greene et al. | May 13, 1958 |
| 2,926,230 | Foster | Feb. 23, 1960 |
| 2,938,990 | Levine | May 31, 1960 |